United States Patent [19]

Wagner et al.

[11] Patent Number: 4,987,029
[45] Date of Patent: Jan. 22, 1991

[54] MULTI-LAYER FILM ARRANGEMENT CAPABLE OF BEING DEEP-DRAWN

[75] Inventors: Werner Wagner, Bad Nenndorf; Axel Bruder, Burgwedel; Kurt Giehsler, Hannover, all of Fed. Rep. of Germany

[73] Assignee: J. H. Benecke AG, Hannover, Fed. Rep. of Germany

[21] Appl. No.: 520,230

[22] Filed: May 9, 1990

[30] Foreign Application Priority Data

May 10, 1989 [DE] Fed. Rep. of Germany ....... 3915255

[51] Int. Cl.$^5$ .............................................. B32B 3/26
[52] U.S. Cl. ............................. 428/319.3; 428/319.7; 428/328; 428/329
[58] Field of Search ................... 428/319.3, 319.7, 328, 428/329

[56] References Cited

U.S. PATENT DOCUMENTS 4,166,146  8/1979  Köos ................................ 428/319.7

FOREIGN PATENT DOCUMENTS 3417729  11/1985  Fed. Rep. of Germany .

OTHER PUBLICATIONS

Felsher, Hal-Curtis and Hanau, Walter J. "Special Decorative Effects" [Modern Plastics, Dec. 1961] pp. 94-95, and pp. 177-183.

Primary Examiner—William J. Van Balen
Attorney, Agent, or Firm—Cushman, Darby & Cushman

[57] ABSTRACT

A multi-layer arrangement of films which is capable of being deep-drawn including at least an upper and lower film, which is backed by a foam layer, for example, polyurethane foam, for the fabrication of molded objects such as automobile dashboards or similar parts, wherein at least one layer (12, 14) contains particulate pigments which are added during the fabrication of the film and which have essentially no effect on the color of the upper layer (12).

7 Claims, 2 Drawing Sheets

MULTI-LAYER FILM ARRANGEMENT CAPABLE OF BEING DEEP-DRAWN

BACKGROUND OF THE INVENTION

The invention concerns a multi-layer film arrangement capable of being deep-drawn according to the description of claim 1.

Such a multi-layer film arrangement capable of being deep-drawn finds a wide area of application in, for example, in the interior covering of automobiles. In this case, the layers, preferably backed with polyurethane foam, are deep-drawn with a desired mold, to form, for example, an automobile dashboard.

Fundamentally such dashboards or similar items have proved satisfactory many times in actual usage. However, a problem always still remains, which can be traced back to the fact that the dashboard is often exposed to very large temperature increases, as a consequence of radiant heating if the automobile stays in the sun for a long time. The situation is made more difficult by the fact that the automobile manufacturers choose predominantly black colors for the dashboards.

The black pigment particles absorb the radiant heat with, so to speak, optimal efficiency and transmit the resulting heat to and through the film covering, further, to the foam layer.

It has now been shown that the temperature at the foam layer due to heat transfer from the film can reach values above 115° C. As a result the foam layer decomposes, at least on the side directly against the film. The resultant decomposition products enter the film and catalyze its own decomposition.

In addition, as a result of this disintegration of the film, cracks form and finally the film can even split (resembling the surface of a completely dried out river bed.)

SUMMARY OF THE INVENTION

The invention is based on the requirement to form a multi-layer film arrangement according to the description of claim 1 in which the decomposition of the polyurethane foam and the consequent formation of cracks is clearly reduced, despite the unavoidable heating due to solar radiation.

The invention achieves this goal by means of the aforementioned multi-layer film arrangement which is capable of being deep-drawn, in which at least one film layer contains particulate light reflecting pigments, which are added during fabrication of the film and which essentially have no effect on the color of the upper layer.

The invention is based on the knowledge that the weak point at high temperature is not the film itself, but rather the polyurethane foam layer, with which the problems are associated. If the film splits, the foam layer is to a large degree responsible, namely because of the products generated by its own decomposition.

The invention is based on the fundamental idea of leaving the foam layer itself essentially unchanged. However, the temperature at the boundary layer between the lower film below the foam layer is reduced at least to a level where the decomposition of the foam layer is drastically reduced. Also, consequently, the breakdown of the film due to crack formation is largely inhibited.

A film, completely new in its structure, results from the addition of, for example, aluminum powder to a film layer. In this regard, it has been shown that heating of the film by radiant heating can be substantially reduced by means of the individual fine particles or pigments of light reflecting material, with the result that the film is no longer heated as much. As a result, also, less heat is transferred from the film to the foam layer. Temperatures at the boundary layer between the film and the foam layer are held at a low enough values so the tendency for the foam layer to decompose is clearly reduced.

It can be shown experimentally that the temperature at the boundary layer can be reduced by about 30° C. by means of the invention. To be sure, this value of 30° C. does not appear to be very large. However, one must take into consideration that one is in a boundary region here. In this regard, the above mentioned 30° C. is quite sufficient, because the temperature is well below the critical failure temperature at which the decomposition of the foam layer begins.

It is certainly known that sunlight can be stopped by the use of aluminum foil reflectors because the light rays are reflected by the aluminum. For that reason also, window shades for building windows come with aluminum on the surface which faces the outside. In this case, the possible heating is less important than the exclusion of sunlight. The disadvantage here is that the surface of the shades necessarily has the aluminum color.

In contrast, in the invention light reflecting powder is nevertheless, added to at least one of the film layers during its fabrication, in which case the powder is not at the surface but rather inside of the film itself, so that the desired, predominantly black color for a dashboard can be retained.

In a practical refinement of the invention, the upper layer has a separate pigmented paint layer or film, in order to give a satisfactory color match.

According to a further advantageous refinement of the invention, it is made certain that the lower film also contains light reflecting powder and even more advantageously a higher proportion than the upper layer.

It is critical for the reflective action of the light reflecting powder, in the sense of reducing the heat of the film arrangements by radiant heating, that the powder is applied in very large amounts at the surface. In this case the amount of light reflecting powder that is added is governed by the permissible color changes which can occur, and which is in general less than if a backing was applied to the film.

The particle size of the light reflecting powder is preferably between 3 and 100 $\mu$m.

Further effective refinements of the invention result from the subclaims, the description and the diagrams.

BRIEF DESCRIPTION OF THE DRAWINGS

The invention is more precisely illustrated in the following section, in order that it may be better understood by means of the examples of its practice shown in the diagrams. They show.

DETAILED DESCRIPTION OF THE PREFERRED EMBODIMENT

Figure 1:
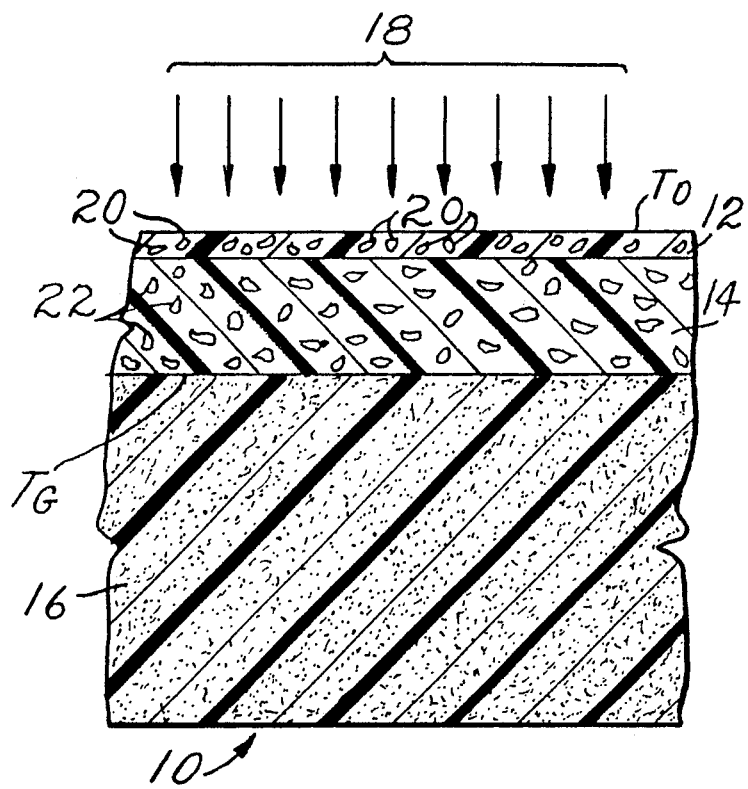
FIG. 1. A schematic cross-sectional view of a film arrangement with a foam backing.

FIG. 1 shows a schematic partial crosssectional view of a dashboard as interior covering of an automobile. The entire unit is given the designation number 10. The dashboard 10 consists of a film arrangement with an upper film 12 and a lower 14 which has a polyurethane foam backing layer 16.

The thermal rays 18 acting on the dashboard 10 are indicated by the vertical arrows. They produce a temperature $T_0$ on the upper film and a boundary temperature $T_0$ at the lower film.

A dashboard 10, as it has been described so far, is close to what is well known, if one does not consider the pigments 20 and 22 (for example, aluminum powder) schematically represented in FIG. 1.

Figure 3:
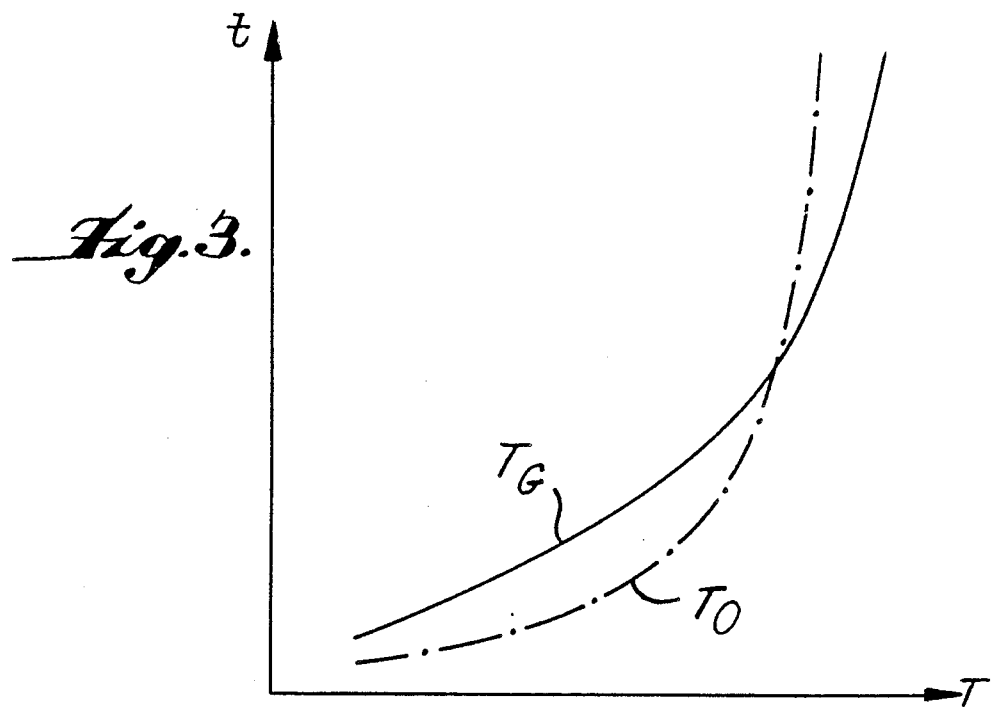
FIG. 3. A diagram to illustrate the temperature change on standing as a function of time, at the surface of the film arrangement and at the boundary layer between the film arrangement and the foam layer, under current practice.

In order to better explain the invention, reference is made to FIG. 3 which basically illustrates the change in the surface temperature $T_0$ and the boundary temperature of $T_0$ in the usual type of dashboard which does not contain the light reflecting powder 20, and 22 shown in FIG. 1. The temperature T is plotted against time t.

FIG. 3 then shows that the boundary temperature $T_0$ is (which is also the temperature at the upper surface of the polyurethane foam layer) as it is affected by heat rays 18, at first, as expected, lower than the surface temperature. However, with longer periods of exposure, after a certain time t, it not only increases but is even higher than the surface temperature $T_0$ itself. This leads to the disadvantages described at the beginning and the disintegration of the film arrangement 12, 14 by the formation of cracks.

In the case of the invention, pigments or aluminum powder 20 and 22 are then added to the upper film 12 and the lower film 14 as shown in FIG. 1. This aluminum powder acts as a reflector, with the results that the heating of both films 12 and 14 is reduced. In this case the lower film 14 contains more light reflecting powder on a percentage basis than the upper film 12.

Figure 4:
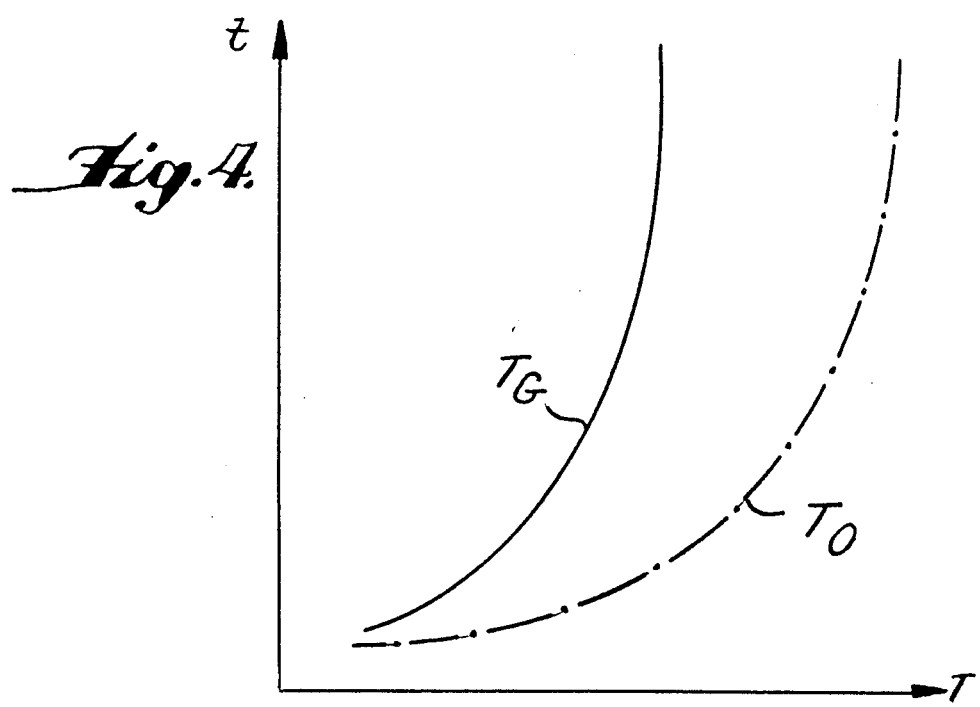
FIG. 4. A schematic diagram corresponding to FIG. 3 but with a film arrangement made according to the invention.

The change of the surface temperature $T_0$ or the boundary temperature $T_0$ for such a new type of film arrangement, is shown schematically in FIG. 4. As indicated in this diagram, the boundary temperature $T_0$ remains always lower than the surface temperature $T_0$ even after longer exposure times to heat rays 18. This is not the case on standing, in current practice, as shown in FIG. 3.

It is then clear, that a reduction in the boundary temperature $T_0$ is achieved by the use of aluminum powder 20 and 22. Measurements have shown that a temperature reduction of about 30° C. is possible.

This lower boundary temperature $T_0$ obtained by means of the invention is in the range where decomposition of the polyurethane foam layer can be reduced or retarded. In this way too, it is assured that scarcely any decomposition products reach film arrangement 12 and 14 and also that the film arrangement 12, 14 is therefore less damaged by stronger heat rays 18.

Figure 2:
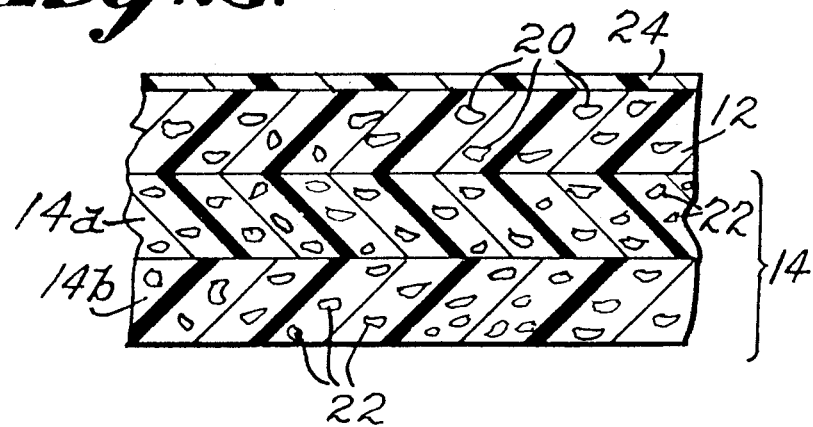
FIG. 2. Another application example of a film arrangement.

FIG. 2 shows another example of the practice of the invention, another film arrangement in which for the sake of simplicity the lower polyurethane foam layer is omitted.

This film arrangement consists of an upper film 12 and a two layer lower film 14 composed of the individual film layers 14a and 14b. In this case the layers 14a and 14b can also be combined into one layer.

In order to reduce the heating resulting from radiant heating to the desired extent, the individual film layers again contain aluminum powder 20 or 22, in which case the most diverse particle sizes can be used.

In order to prevent the color tone of the covering layer or the upper film 12 from being altered by the light reflecting material, the upper film is provided with a complete surface treatment in the form of a cover layer 24, which can consist of a paint coating or also be a separate film. The cover layer 24 is in this case free of light reflecting powder. A preferred example of the practice of the invention is based on the following thickness proportions:

| | |
|---|---|
| Aluminum free paint coating or film | Thickness 0.002–0.2 mm |
| Aluminum containing layer 12 | Thickness 0.05–0.4 mm |
| Aluminum containing layer 14a | Thickness 0.2–1.0 mm |
| Aluminum containing layer 14b | Thickness 0.2–1.0 mm |

In terms of the aluminum (Al) content the following values apply in the case of the example being illustrated:

| | |
|---|---|
| Paint coating or film 24 | Al free |
| Al containing film 12 | Al content <10% |
| Al containing film 14a | Al content ≧2% |
| Al containing film 14b | Al content ≧2% |

In the described forms of the practice of the invention aluminum powder was presented as an example of a light reflecting material for the practice of the invention. However, the invention is not limited to this, because other light reflecting metals can also be used as pigments in place of aluminum powder, such as titanium dioxide, metal tinsel, and other light reflecting metals.

WHAT IS CLAIMED IS:

1. A multi-layer arrangement of films which is capable of being deep-drawn comprising at least an upper and lower film, which is backed by a foam layer, for the fabrication of molded objects wherein at least one layer (12, 14) contains particulate pigments which are added during the fabrication of the film and which have essentially no effect on the color of the upper layer (12).

2. A film arrangement according to claim 1, in which the upper film (12) contains aluminum powder (20) which is added during the fabrication of the upper film (12).

3. A film arrangement according to claim 1 in which the lower film (14) contains particulate, light reflecting pigments (22).

4. A film arrangement according to claim 3, in which the upper film (12) contains less particulate light reflecting pigment (20) than the lower film (14).

5. A film arrangement according to claim 1 in which the film arrangement (12, 14) has an upper overcoat layer (24).

6. A film arrangement according to claim 5, in which the overcoat layer is a paint coating or a film.

7. A film arrangement according to claim 1 in which the particle size of the light reflecting material (20, 22) is between 3 and 100 μm.

* * * * *